(12) United States Patent
Rozenbaum

(10) Patent No.: US 9,913,779 B2
(45) Date of Patent: Mar. 13, 2018

(54) INFANT BOTTLE AND FEEDING METHOD THEREFOR

(71) Applicant: Linda Rozenbaum, Rishon Lezion (IL)

(72) Inventor: Linda Rozenbaum, Rishon Lezion (IL)

( * ) Notice: Subject to any disclaimer, the term of this patent is extended or adjusted under 35 U.S.C. 154(b) by 0 days.

(21) Appl. No.: 15/030,604

(22) PCT Filed: Nov. 18, 2014

(86) PCT No.: PCT/IL2014/051001
§ 371 (c)(1),
(2) Date: Apr. 20, 2016

(87) PCT Pub. No.: WO2015/079434
PCT Pub. Date: Jun. 4, 2015

(65) Prior Publication Data
US 2016/0250106 A1    Sep. 1, 2016

(30) Foreign Application Priority Data

Nov. 27, 2013   (IL) .......................................... 229662

(51) Int. Cl.
| *A61J 9/06* | (2006.01) |
| *A61J 9/00* | (2006.01) |
| *A47J 41/00* | (2006.01) |
| *A61J 11/00* | (2006.01) |
| *B65D 85/816* | (2006.01) |
| *A61J 11/04* | (2006.01) |

(52) U.S. Cl.
CPC ............... *A61J 9/005* (2013.01); *A47J 41/00* (2013.01); *A61J 9/001* (2013.01); *A61J 11/0065* (2013.01); *B65D 85/816* (2013.01); *A61J 11/04* (2013.01)

(58) Field of Classification Search
CPC .... A61J 9/001; A61J 9/005; A61J 9/04; A61J 9/06
USPC .................................. 215/11.3, 11.6; 383/80
See application file for complete search history.

(56) References Cited

U.S. PATENT DOCUMENTS

| 2,328,354 | A | * | 8/1943 | Montano | ................... A61J 9/00 215/11.3 |
| 2,628,908 | A | * | 2/1953 | Horan | ....................... A61J 9/00 215/11.3 |
| 2,628,912 | A | * | 2/1953 | Horan | ....................... A61J 9/00 215/11.3 |
| 2,643,448 | A | * | 6/1953 | Piazze | .................... A61J 9/005 215/11.3 |

(Continued)

FOREIGN PATENT DOCUMENTS

| CA | 2022045 | 1/1992 |
| CN | 202286862 | 7/2012 |

(Continued)

*Primary Examiner* — Sue A Weaver
(74) *Attorney, Agent, or Firm* — Edward Langer

(57) ABSTRACT

An infant bottle (10) method and kit, wherein the bottle comprising: a disposable bag (20), for containing a beverage (30, 44, 46); a foldable bag frame (16), for deploying therein the disposable bag (20) at a deployed state of the foldable bag frame (16), wherein a folded state thereof occupies less space than an unfolded state thereof; and a teat (14), for covering the disposable bag (20) in a sealed manner, thereby resulting in a compact infant bottle (10) at a folded state of the foldable bag frame (16), and sealable upon deployment.

8 Claims, 7 Drawing Sheets

(56) References Cited

U.S. PATENT DOCUMENTS

| | | | | |
|---|---|---|---|---|
| 3,266,910 | A | * | 8/1966 | Barnby ..................... A61J 9/00 |
| | | | | 215/11.1 |
| 4,466,547 | A | | 8/1984 | Klittich |
| 4,877,128 | A | * | 10/1989 | Strickland ............... A61J 1/165 |
| | | | | 206/170 |
| 5,054,168 | A | * | 10/1991 | Gandy ..................... B26F 3/02 |
| | | | | 24/30.5 L |
| 5,713,108 | A | * | 2/1998 | Solomon ............ B65D 33/1675 |
| | | | | 24/30.5 R |
| 5,860,540 | A | * | 1/1999 | Bock ....................... A61J 9/005 |
| | | | | 215/11.1 |
| 6,899,239 | B1 | * | 5/2005 | Gray ....................... A61J 9/001 |
| | | | | 215/11.3 |
| 2004/0045841 | A1 | * | 3/2004 | Segovia, Jr. .......... A61J 1/2093 |
| | | | | 206/219 |
| 2006/0157437 | A1 | * | 7/2006 | Tamir ..................... A61J 9/001 |
| | | | | 215/11.3 |
| 2015/0024085 | A1 | * | 1/2015 | McBean .................. A61J 11/04 |
| | | | | 426/2 |

FOREIGN PATENT DOCUMENTS

| | | | | |
|---|---|---|---|---|
| GB | 2109247 | | 6/1983 | |
| GB | 2181062 A | * | 4/1987 | ............. A61J 9/005 |
| GB | 2414006 | | 4/2005 | |
| WO | 2008038054 | | 4/2008 | |

\* cited by examiner

INFANT BOTTLE AND FEEDING METHOD THEREFOR

TECHNICAL FIELD

The present invention relates to the field of infant feeding. More particularly, the invention relates to a method and apparatus for preparing an infant beverage.

BACKGROUND ART

An infant bottle is a bottle including a teat, for drinking directly from it. The infant bottle is designed for allowing any angle of tilt, such that the beverage may exit only through a small hole disposed at the top. Thus, the bottle is sealed everywhere, except for this hole.

The typical baby bottle includes a receptacle having a bottom and a thread at the top thereof. The teat is inserted into a ring having a complementary thread. Thus the teat is pressed between the ring and the receptacle, thus providing a sealed connection.

However, this prior art bottle is disadvantaged in that the receptacle typically requires a long brush for cleaning it. In addition, the bottle is not foldable. As well, preparation of the beverage requires several stages, and the inconveniency is well known.

Disposable bottles are known. However, they are prohibitively expensive.

All the methods described above have not yet provided satisfactory solutions to the problem of quick and convenient preparation of the infant beverage to be contained in the infant bottle.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to an infant bottle (10), comprising: a disposable bag (20), for containing a beverage (30, 44, 46); a foldable bag frame (16), for deploying therein the disposable bag (20) at a deployed state of the foldable bag frame (16), wherein a folded state thereof occupies less space than an unfolded state thereof; and a teat (14), for covering the disposable bag (20) in a sealed manner, thereby resulting in a compact infant bottle (10) at a folded state of the foldable bag frame (16), and sealable upon deployment.

According to one embodiment of the invention, the disposable bag (20) is supplied with a feeding powder (30), for pouring a liquid (46) thereinto upon being deployed by the foldable bag frame (16).

According to one embodiment of the invention, the disposable bag (20) is manufactured to be closed and containing feeding powder (30), for pouring a liquid (46) thereinto upon being opened and deployed by the foldable bag frame (16).

The disposable bag (20) may further comprise a tearing line (12), for being opened thereby.

The infant bottle (10) may further comprise a closed bag holder (28), for holding one or more disposable bags (20) containing feeding powder (30), the closed bag holder (28) comprising a bracket (58) for each disposable bag (20) for maintaining a closed state thereof, for preventing the powder (30) from falling therefrom, thereby the disposable bag (20) is supplied with the powder (30).

The infant bottle (10) may further comprise: a liquid container (50), for pouring liquid (46) into the disposable bag (20), thereby resulting in a compact feeding kit (42), ready for use.

The infant bottle (10) may further comprise: a rigid teat frame (22), for (a) holding the teat (14); (b) pressing the teat (14) onto the disposable bag (20) in the sealed manner; and (c) avoiding folding the bag frame (16).

The teat frame (22) and the bag frame (16) may comprise complementary fastening means (56, 18), for fastening together.

The foldable bag frame (16) may comprise several rigid walls (52) being foldable one in relation to the other along the height of the infant bottle (10).

The foldable bag frame (16) may comprise a rotatable bottom (26), for being disposed parallel to a wall (52) of the foldable bag frame (16) at the folded state, and for being disposed perpendicular to the walls (52) of the foldable bag frame (16) at the deployed state, thereby the rotatable bottom (26) avoids folding the foldable bag frame (16) at the deployed state.

In another aspect, the present invention is directed to an infant feeding method, comprising the steps of: deploying a foldable frame (16) wherein a folded state thereof occupies less space than an unfolded state thereof; deploying a disposable bag (20) into the deployed foldable frame (16); pouring a liquid (46) into the disposable bag (20); and covering the disposable bag (20) in a sealed manner by a teat (14), thereby producing a ready to feed bottle (10), from foldable components.

The disposable bag (20) may be supplied with a feeding powder (30), thereby the step of pouring the liquid into the disposable bag (20) produces a beverage (44).

The step of deploying the disposable bag (20) may comprise the step of extracting the disposable bag (20) from a closed bag holder (28) which has maintained a closed state of the disposable bag (20).

In yet another aspect of the, the invention is directed to an infant feeding kit, comprising: a foldable feeding bottle (10); a holder (28) storing at least one feeding powder bag (20); and, optionally, each of the bags further comprises a bracket (58), for keeping the bag thereof sealed.

The kit (42) may further comprise a thermos (50).

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings.

It should be understood that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

Figure 1A:
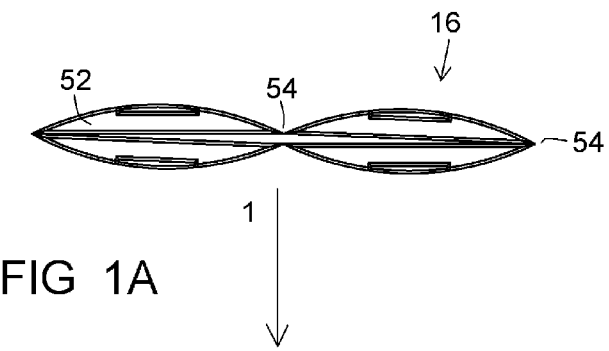
FIG. 1A is a top view of a bag frame according to one embodiment of the present invention.

FIG. 1A is a top view of a bag frame according to one embodiment of the present invention.

A bag frame 16 is designed for deploying a disposable bag 20 (shown in FIG. 3) thereinto. Bag frame 16 includes several relatively rigid walls 52, separated by folds 54, allowing folding thereof along the height of walls 52.

Bag frame 16 is supplied in the folded state of FIG. 1A.

Figure 1B:
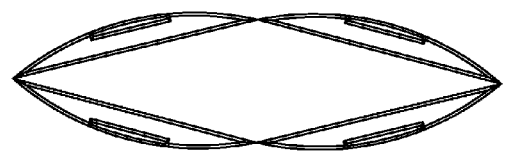
FIG. 1B is a top view of the bag frame of FIG. 1A at the first step.

FIG. 1B is a top view of the bag frame of FIG. 1A at the first step.

At the first step, the user deploys bag frame 16 to the semi-folded state of FIG. 1B.

Figure 1C:
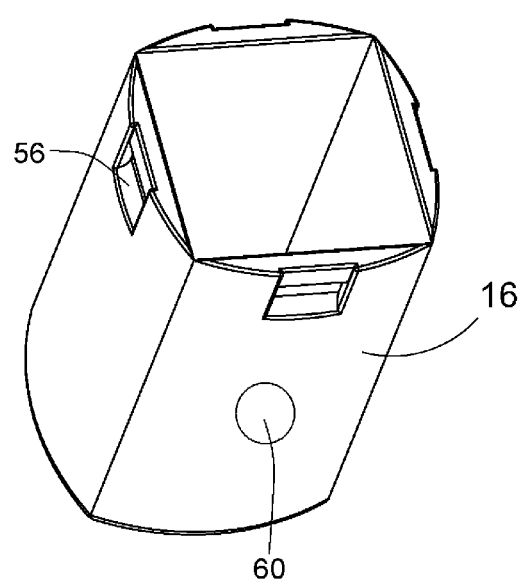
FIG. 1C is a top perspective view of the bag frame of FIG. 1A at the second step.

FIG. 1C is a top perspective view of the bag frame of FIG. 1A at the second step.

At the second step, the user deploys bag frame 16 to the unfolded state of FIG. 1C. Bag frame 16 is not intended for containing beverage, as it may include holes 60, but rather is intended for containing a disposable bag.

Each wall includes a depression 56 for snapping a teat frame 22 (shown in FIG. 5) thereon.

Figure 2:
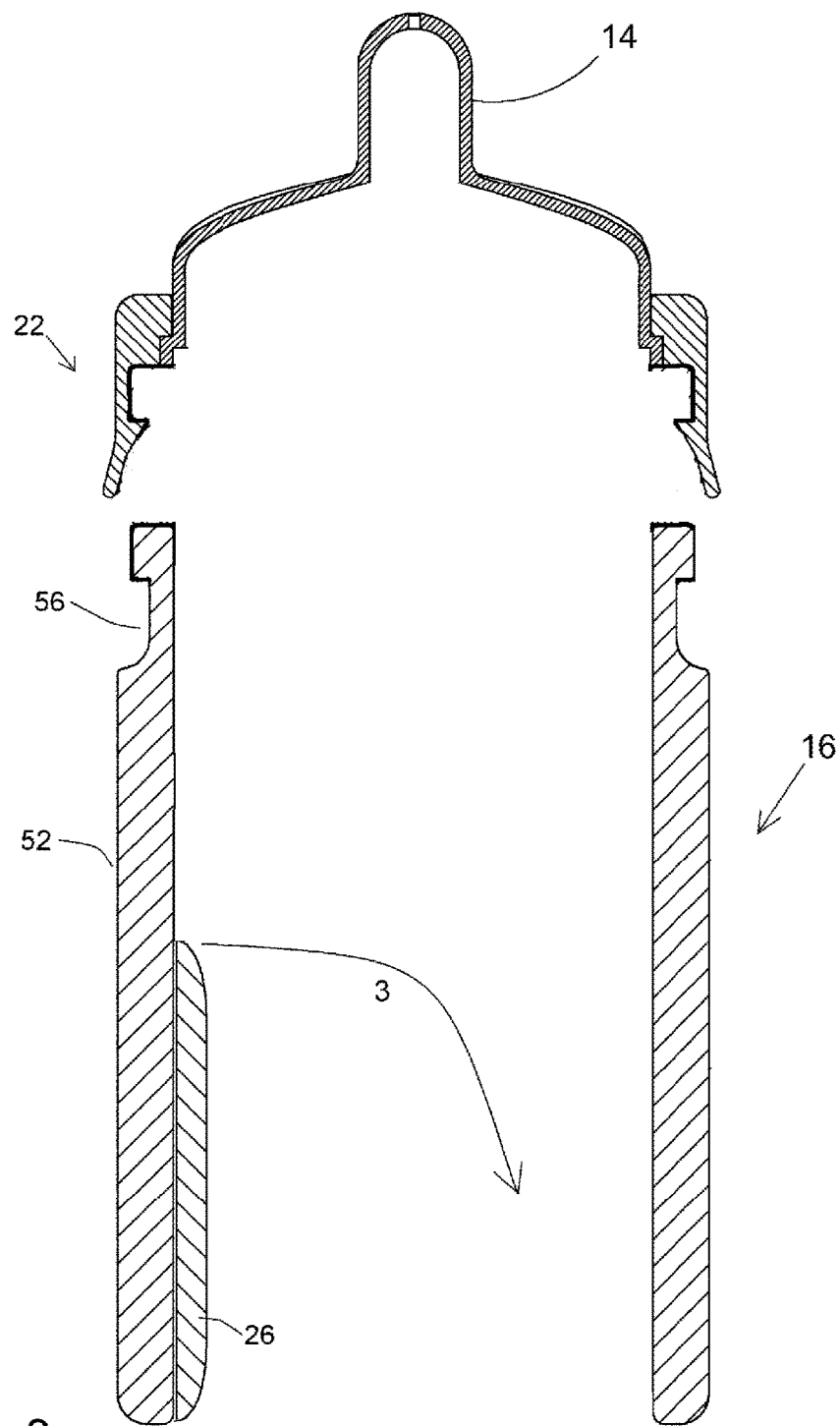
FIG. 2 is a side sectional view of the bag frame of FIG. 1A, and of the teat and the teat frame, for connecting to the bag frame.

FIG. 2 is a side sectional view of the bag frame of FIG. 1A, and of the teat and teat frame, for connecting to the bag frame.

For avoiding folding the bottom of bag frame 16 back to the folded state of FIG. 1A, bag frame 16 includes a rotatable bottom 26, being pivotally connected to one of walls 52. Bag frame 16 is supplied in the folded state of FIG. 1A, parallel to the wall 52. At the third step the user draws bottom 26 away from the wall 52, thus rotating it for being perpendicular to all walls 52, being the state depicted in FIG. 4

Figure 3:
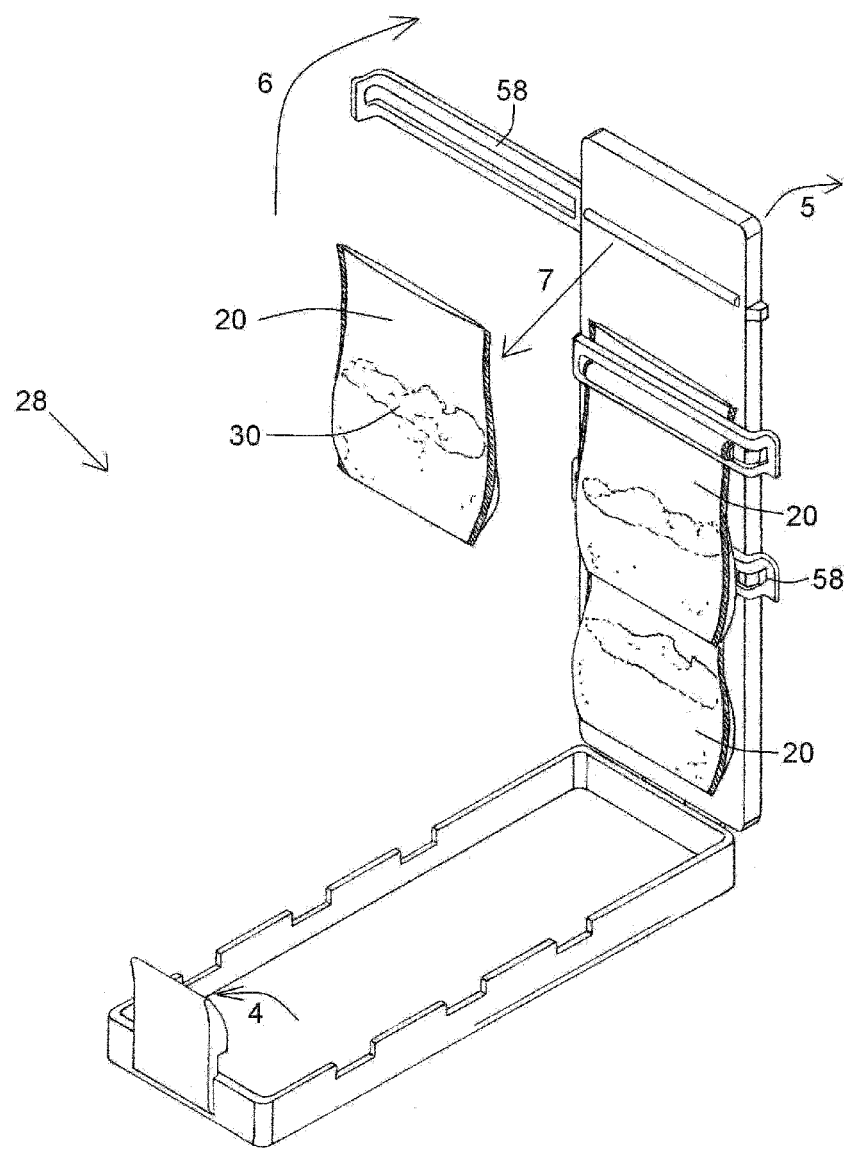
FIG. 3 depicts a closed-bags holder according to one embodiment, and the steps of taking out one of the bags.

FIG. 3 depicts a closed-bags holder according to one embodiment, and the steps of taking out one of the bags.

A closed-bags holder 28 accompanies disposable bags 20 each for containing a feeding powder 30 in a closed state, for preventing powder 30 from falling out of the disposable bag 20. According to this embodiment, at the fourth step, the user unlocks the closed bag holder 28; at the fifth step, the user opens closed-bags holder 28; at the sixth step the user opens the bag bracket 58; and at the seventh step, the user extracts one disposable bag 20, containing powder 30, out of closed-bags holder 28.

Figure 4:
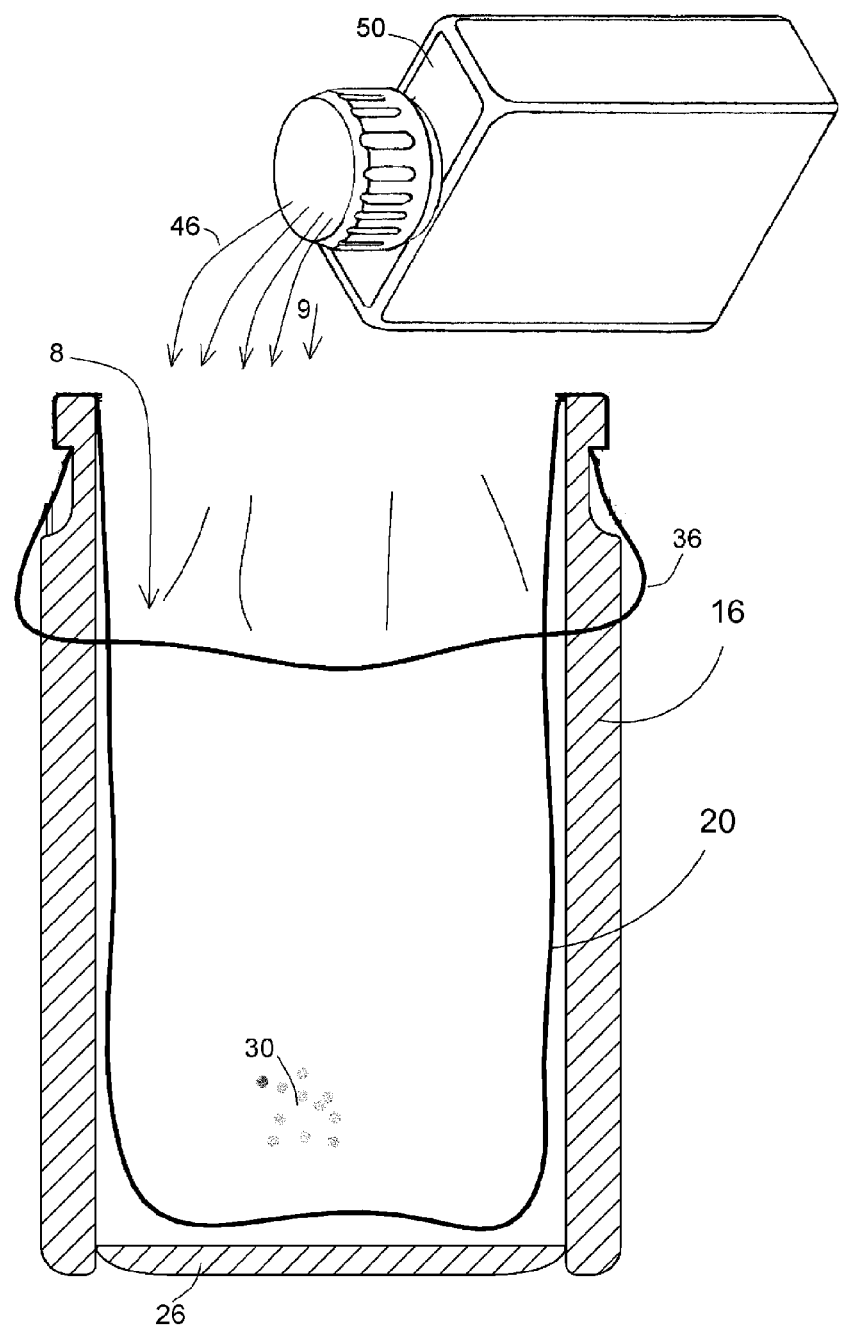
FIG. 4 depicts the bag frame of FIG. 2 containing the bag of FIG. 3.

FIG. 4 depicts the bag frame of FIG. 2 containing the bag of FIG. 3.

At the eighth step, the user deploys disposable bag 20 containing feeding powder 30. The rims 36 of disposable bag 20 are disposed outside bag frame 16.

Disposable bag 20 may be of plastic, nylon, aluminum foil, or any other material, for containing a beverage.

Figure 6:
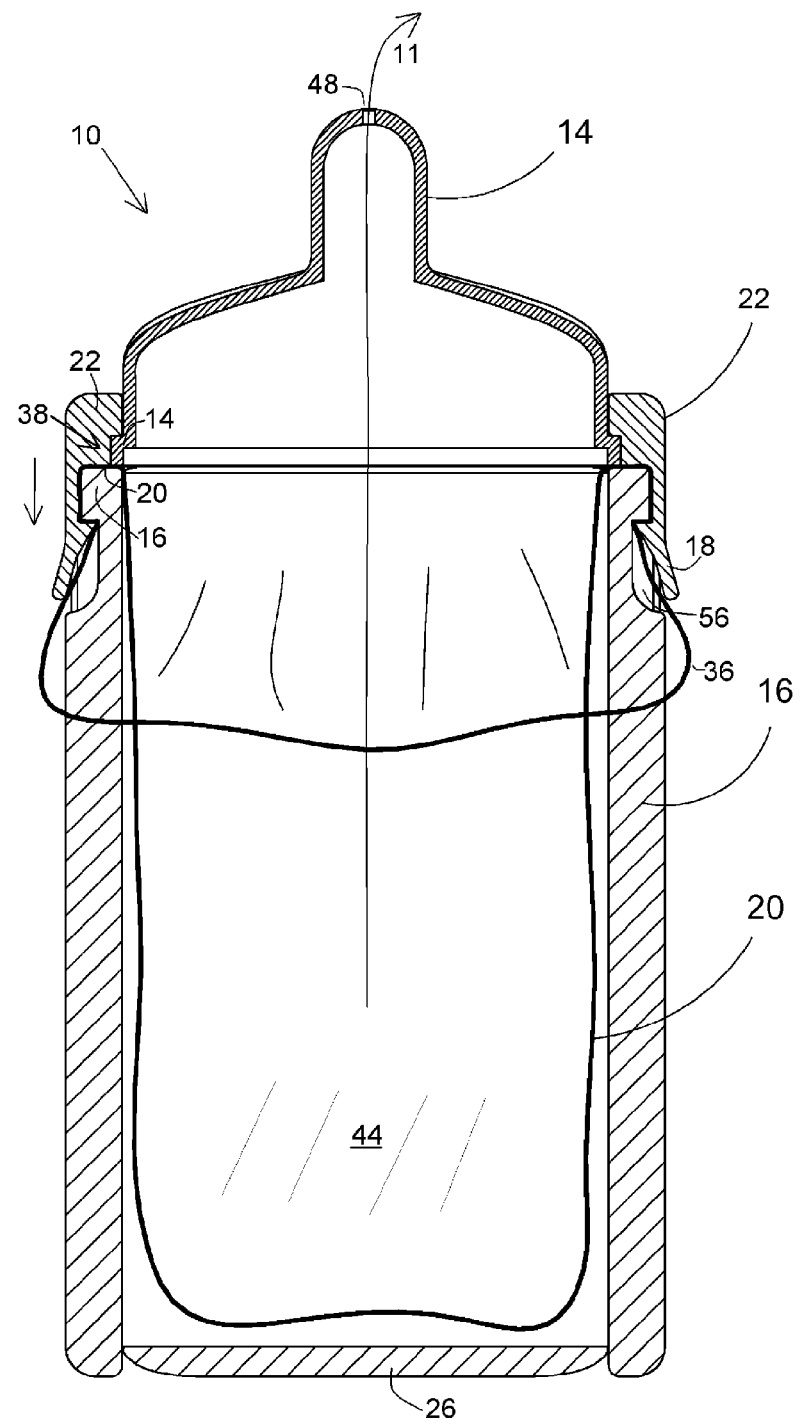
FIG. 6 is a sectional view of the bottle being ready for use.

At the ninth step, the user pours liquid 46 from a liquid container 50 onto powder 30 within disposable bag 20, producing a beverage 44 (enumerated in FIG. 6). Container 50 preferably constitutes a thermos, for containing heated liquid, such as heated water and/or milk.

Referring again to FIG. 2, at the tenth step, the user snaps teat frame 22 holding teat 14, to depression 56 of bag frame 16.

Figure 5:
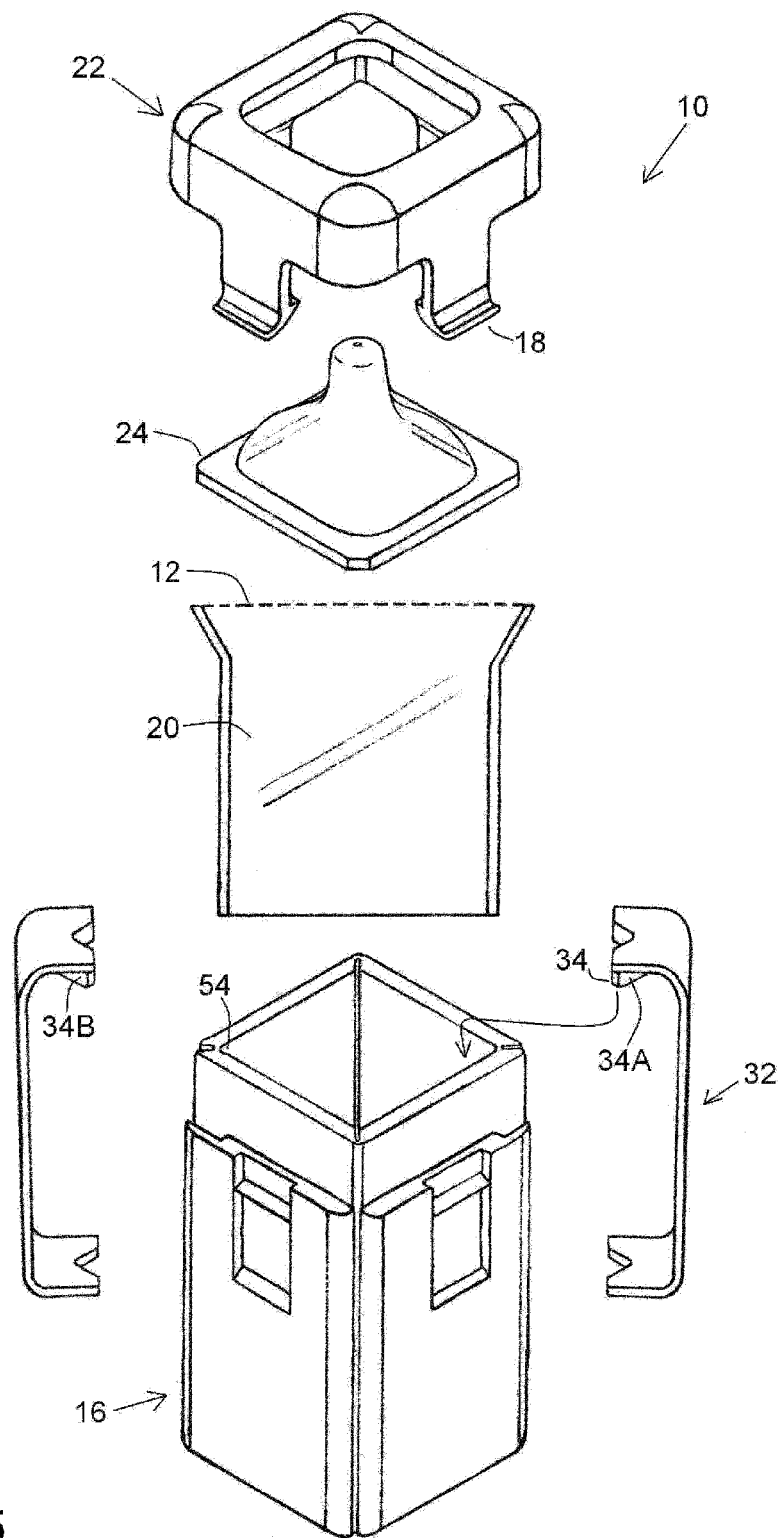
FIG. 5 is a perspective view of the various elements of the bottle described in FIGS. 1 to 4.

FIG. 5 is a perspective view of the various elements of the bottle described in FIGS. 1 to 4.

Thus, the infant bottle 10 includes bag frame 16, into which bag 20 is inserted. Teat 24 is inserted into teat frame 22. Teat frame 22 snaps bag frame 16.

According to one embodiment, bars 32 may further prevent folding of bag frame 16. According to one embodiment, bar 32 includes protrusions 34 having lines 34A and 34B being complementary to fold 54, for inserting each protrusion 34 into fold 54.

FIG. 6 is a sectional view of the bottle being ready for use.

The snapping of the tenth step seals teat 14 to disposable bag 20, since at perimeter 38 teat frame 22 presses teat 14; and nylon bag 20 is pressed between teat 14 and bag frame 16. A male snapping element 18 inserted into depression 56 of bag frame 16 provides the pressure of teat frame 22 on bag frame 16, and thus on teat 14. Male snapping element 18 and depression 56 of bag frame 16 constitute one example of complementary fastening means, for fastening together.

At the eleventh step, the infant may drink through hole 48 of infant bottle 10. Pressure applied on infant bottle 10, such as by holding thereof, does not allow folding it at the top due to nipple frame 22, and does not allowing folding it at the bottom due to bottom 26, both being relatively rigid.

Figure 7:
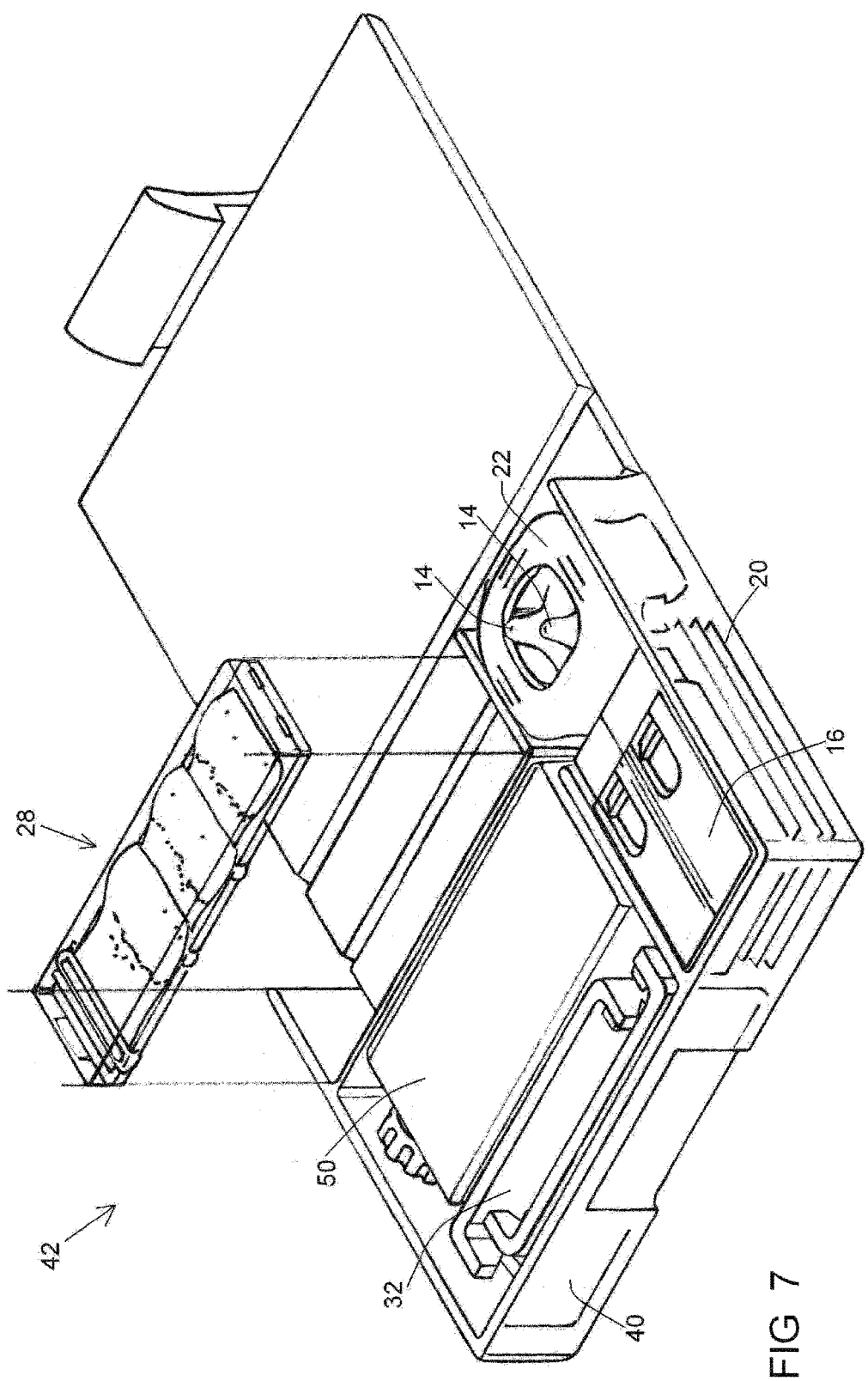
FIG. 7 depicts the entire feeding kit, according to one embodiment of the present invention.

FIG. 7 depicts the entire feeding kit, according to one embodiment of the present invention.

The feeding kit 42 includes bag frame 16, a plurality of empty bags 20, shown in the figure below bag frame 16, teat frame 22, one teat 14, or preferably a plurality of teats 14 for being disposable and replaceable, thermos 50 for pouring liquid into disposable bag 20, and closed bags holder 28, all preferably packaged by a compact suitcase 40.

For example, the mother of the infant fills 3-4 disposable empty bags 20 with feeding powder 30. The mother then inserts the filled bags 20 into closed-bags holder 28.

According to another embodiment, bags 20 are marketed closed/stamped, and containing feeding powder 30, for being opened by opening a tearing line 12, and thus there is no need for closed-bags holder 28. This embodiment is advantaged of freshness of the feeding powder 30.

The mother further fills thermos 50 with heated water and/or milk. The mother then closes suitcase 40, and supplies it to the nursery school teacher. Upon need or demand, the teacher deploys bag frame 16, according to one embodiment with bars 32; then fills bag 20 containing powder 30 of closed-bags holder 28 into bag frame; then pours liquid into bag 20 from thermos 50; then inserts one of teats 14 into nipple frame 22; then snaps teat frame 22 to bag frame 16.

In the figures and/or description herein, the following reference numerals (Reference Signs List) have been mentioned:

numeral 10 denotes an infant bottle according to one embodiment of the present invention;
numeral 12 denotes a tearing line;
numeral 14 denotes a teat;
numeral 16 denotes a foldable bag frame;
numeral 18 denotes a snapping element of the teat frame;
numeral 20 denotes a disposable bag, for containing powder and for further containing the beverage;
numeral 22 denotes the nipple frame;
numeral 24 denotes the teat;
numeral 26 denotes the bottom of the bag frame, the bottom being rotatable, for allowing or disallowing folding the bag frame;
numeral 28 denotes a holder for closed bags containing feeding powder;
numeral 30 denotes feeding powder;
numeral 32 denotes a bar for maintaining the shape of the bag frame;
numeral 34 denotes a protrusion;
numeral 34A and 34B denote protruding lines of protrusion 34;
numeral 36 denotes the rim of the disposable bag;
numeral 38 denotes a location shown in the figure;
numeral 40 denotes a suitcase, for containing the feeding kit, according to one embodiment of the present invention;
numeral 42 denotes the feeding kit, including the main components for feeding the infant;
numeral 44 denotes the beverage, including the liquid and the feeding powder;
numeral 46 denotes the liquid poured;
numeral 48 denotes a hole in the teat, for drinking therethrough;
numeral 50 denotes a container, such as a thermos;
numeral 52 denotes a wall of the bag frame;
numeral 54 denotes a fold of the bag frame;
numeral 56 denotes a depression;
numeral 58 denotes a bracket, for closing the bags containing powder only; and
numeral 60 denotes in the bags frame, for demonstrating that the bags frame need not contain liquid.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. An infant bottle (10), comprising:
   a disposable bag (20), for containing a beverage (30, 44, 46);
   a non-disposable rectangular/quadratic longitudinally-foldable bag frame (16), for deploying therein said disposable bag (20) at a deployed state of said foldable bag frame (16),
   a rectangular/quadratic non-foldable teat frame (22), connectable to said foldable frame (16), for preventing from said foldable bag frame (20) to collapse when being connected to each other; and
   a teat (14) connectable to said teat frame (22), for covering said disposable bag (20) in a sealed manner,
   such that said infant bottle (10) is compact at a folded state of said foldable bag frame (16), sealable and non-collapsible upon deployment.

2. An infant bottle (10) according to claim 1, wherein said disposable bag (20) is supplied containing feeding powder (30), for pouring a liquid (46) thereinto upon being deployed by said foldable bag frame (16).

3. An infant bottle (10) according to claim 1, wherein said disposable bag (20) is manufactured to be closed and containing feeding powder (30), for pouring a liquid (46) thereinto upon being opened and deployed by said foldable bag frame (16).

4. An infant bottle (10) according to claim 3, wherein said disposable bag (20) comprises a tearing line (12), for being opened thereby.

5. An infant bottle (10) according to claim 1, further comprising:
   a closed bag holder (28), for holding one or more disposable bags (20) containing feeding powder (30), said closed bag holder (28) comprising a closure (58) for each disposable bag (20), for maintaining a closed state thereof, for preventing the powder (30) from falling therefrom,
   such that said disposable bag (20) is supplied with the powder (30).

6. An infant bottle (10) according to claim 1, further comprising:
   a liquid container (50), for pouring liquid (46) into said disposable bag (20),
   thereby resulting in a compact feeding kit (42), ready for use.

7. An infant bottle (10) according to claim 1, wherein said foldable bag frame (16) comprises several rigid walls (52) being foldable one in relation to the other along the height of the infant bottle (10).

8. An infant bottle (10) according to claim 1, wherein said foldable bag frame (16) comprises a rotatable bottom (26), for being disposed parallel to a wall (52) of said foldable bag frame (16) at the folded state, and for being disposed perpendicular to the walls (52) of said foldable bag frame (16) at the deployed state, such that said rotatable bottom (26) avoids folding said foldable bag frame (16) at the deployed state.

\* \* \* \* \*